United States Patent [19]

Karas et al.

[11] Patent Number: 4,500,566
[45] Date of Patent: Feb. 19, 1985

[54] BUBBLE PRESSURE BARRIER AND ELECTRODE COMPOSITE

[75] Inventors: Bradley R. Karas, Clifton Park; Charles E. Baumgartner, Schenectady, both of N.Y.

[73] Assignee: General Electric Company, Schenectady, N.Y.

[21] Appl. No.: 433,314

[22] Filed: Oct. 7, 1982

[51] Int. Cl.³ .................... H01M 4/88; H01M 8/00
[52] U.S. Cl. .................... 427/115; 427/126.3; 427/126.5; 427/126.6; 427/226; 427/247; 427/295; 427/337; 427/343; 427/380; 427/435; 429/16; 429/41
[58] Field of Search ............. 429/16, 41; 427/115, 427/126.3, 126.4, 126.6, 226, 247, 295, 337, 343, 380, 435

[56] References Cited

U.S. PATENT DOCUMENTS

| | | | |
|---|---|---|---|
| 3,258,361 | 6/1966 | Kahn | 427/115 |
| 3,471,334 | 10/1969 | Novack et al. | 429/16 |
| 4,404,267 | 9/1983 | Iacovangelo et al. | 429/41 |

FOREIGN PATENT DOCUMENTS

| | | | |
|---|---|---|---|
| 654839 | 12/1962 | Canada | 427/247 |
| 2079943 | 11/1971 | France | 427/247 |

*Primary Examiner*—Norman Morgenstern
*Assistant Examiner*—Richard Bueker
*Attorney, Agent, or Firm*—Jane M. Binkowski; James C. Davis, Jr.; James Magee, Jr.

[57] ABSTRACT

Utilizing an organometallic precursor, a metal oxide is formed within the pores of a porous sintered blank substantially uniformly throughout the porosity of the blank producing a porous bubble pressure barrier of predetermined pore size. The barrier is integrally sintered to a face of an electrode, the median pore size of the barrier being significantly smaller than that of the electrode, producing a composite useful as an electrode in a molten carbonate fuel cell. The blank and the electrode are composed of metal.

3 Claims, 8 Drawing Figures

BUBBLE PRESSURE BARRIER AND ELECTRODE COMPOSITE

The present invention relates to the production of a porous bubble pressure barrier useful in a molten carbonate fuel cell. The porous barrier is comprised of a porous sintered structure or blank having a deposit of metal oxide distributed within its pores substantially uniformly. The barrier is integrally sintered to one face of an anode or cathode forming a composite useful as an electrode in a molten carbonate fuel cell.

The state-of-the-art in molten carbonate fuel cell (MCFC) anodes is to use porous sintered Ni (10 wt. % Cr) electrodes. These structures are typically 60–75% porous, having average pore sizes of 4–6 microns. In an operating cell, these anodes are placed in contact with a $Li_2CO_3/K_2CO_3/LiAlO_2$ or $SrTiO_3$ composite, i.e., a composite composed of electrolyte and supporting matrix referred to in the art as a tile. The $LiAlO_2$ or $SrTiO_3$ particles form a matrix the interstices of which are filled with the carbonate melt. The average pore size in this matrix is 0.2–0.4 microns. Some of the pores in the anode during operation at 650° C. draw electrolyte ($Li_2CO_3/K_2CO_3$) from the tile providing a reaction zone for the hydrogen oxidation reaction $$H_2 + CO_3^= \rightarrow H_2O + CO_2 + 2e^-.$$

The gas fed to the cathode, which is on the opposite side of the tile, is a mixture of $O_2$ and $CO_2$ and some of the pores in the cathode during operation at 650° C. draw electrolyte ($Li_2CO_3/K_2CO_3$) from the tile providing a reaction zone for the oxygen reduction reaction to form carbonate via the overall reaction:

$$\tfrac{1}{2}O_2 + CO_2 + 2e^- = CO_3^=.$$

One of the pivotal problems encountered with operating cells occurs when the tile does not act as a sufficient bubble pressure barrier to the anode and cathode gases or it cracks. When this happens, the gases mix causing, as a minimum, a drop in the cell voltage and loss of electrochemically utilizable fuel, or in more severe cases, destruction of the active electrode(s), and a potential safety hazard. The present invention overcomes these problems by providing an anode or cathode which contains, as an integral part of its structure, a barrier to gas cross leakage.

In the present invention, a porous bubble pressure barrier, usually in the form of a layer or plaque, containing metal oxide within its pores, is incorporated as an integral part of the anode or cathode forming a composite. By controlling the amount of metal oxide within the pores of the barrier, a wide range of pore sizes can be achieved. Since in the presence of an insufficient amount of electrolyte to completely fill all of the pores in the electrodes and electrolyte matrix, the electrolyte fills the smallest pores, one can control the location of the electrolyte and degree of protection by controlling the size of the pores in the bubble pressure barrier. By making the pores in this barrier layer small enough to insure complete filling, the anode and cathode gases can mix only if a sufficient pressure drop exists across the cell to blow the electrolyte out of these pores. For example, if the median pore size, i.e., median pore diameter, of the pores in the barrier layer is approximately 1–3μ, it would theoretically take a ΔP of ~39 psia without flaws.

Since the pores in the barrier layer are smaller than those in the remaining electrode, they fill with electrolyte functioning as a barrier to gas cross leakage without "flooding" the remaining active electrode area, i.e., the anode or cathode. In addition to serving as a cross leak barrier, this barrier layer also ensures integral contact of the anode or cathode to the tile and may allow operation with thinner tiles thus decreasing the cell resistance and increasing the power output of the cell. Another feature of this invention is that since anodes and cathodes are already made by sintering, the addition of this barrier layer or plaque should add very little to the processing cost. Another advantage of this invention is that if portions of the barrier layer do not fill with electrolyte, or lose electrolyte with time, they will still contain the catalyst required to carry out the $H_2$ oxidation reaction or $O_2$ reduction reaction, and are, therefore, electrochemically active just like the anode or cathode.

Briefly stated, in one embodiment, the present invention is a process for producing a porous bubble pressure barrier in the form of a plaque having metal oxide distributed substantially uniformly throughout its pores and having at least one face free of any significant amount of said metal oxide which comprises providing a porous sintered blank in the form of a plaque comprised of a metal selected from the group consisting of nickel, copper, an alloy of nickel and copper, and an alloy of nickel and up to about 10 weight % chromium, said blank having a median pore size ranging from about 1 micron to about 10 microns and a pore volume ranging from about 40% to about 75% by volume of the total volume of said blank, immersing said blank in a fluid organometallic precursor for a metal oxide selected from the group consisting of aluminum oxide, titanium oxide, iron oxide, zinc oxide and cerium oxide, subjecting said fluid to a vacuum sufficient to at least substantially evacuate the pores of said immersed blank and at least significantly fill said evacuated pores with said fluid, retrieving the resulting precursor-filled-blank, removing said precursor from at least one face of said blank leaving no significant amount thereof, infiltrating said precursor-filled blank with water or steam hydrolyzing said precursor within the pores of said blank producing a hydrolyzed product, first firing the resulting hydrolyzed product-containing blank to convert said hydrolyzed product to said metal oxide leaving no significant amount of said hydrolyzed product therein at a temperature ranging from the temperature at which said product decomposes to said metal oxide to less than about 600° C., and second firing the resulting metal oxide-containing blank to remove any water which may be present therein at a temperature ranging from about 600° C. to about 700° C., said first and second firings being carried out at or about atmospheric pressure in a reducing atmosphere, said first and second firings having no significant deleterious effect on said bubble pressure barrier.

Also, briefly stated, in another embodiment, the present invention is a process for producing an integrally bonded electrode composite useful as an electrode in a molten carbonate fuel cell which comprises depositing a layer of an electrode-forming powder on one face of the metal oxide-free-face of the present bubble pressure barrier, said electrode-forming powder covering said face completely, said electrode-forming powder being selected from the group consisting of nickel, copper, an alloy of nickel and copper, and an alloy of nickel and up to about 10 weight % chromium, firing the resulting composite structure in a reducing atmosphere at or about atmospheric pressure, said electrode-forming powder sintering to form an electrode and simultaneously sintering to said barrier forming an integral bond therewith producing said integrally bonded electrode composite, said barrier having a median pore size significantly smaller than the median pore size of said electrode, said firing to form said electrode composite not exceeding the melting point of said composite.

Also, briefly stated, in yet another embodiment, the present invention is a process for producing an integrally bonded electrode composite useful as an electrode in a molten carbonate fuel cell which comprises providing a porous sintered electrode in the form of a plaque, said electrode being selected from the group consisting of nickel, copper, an alloy of nickel and copper, and an alloy of nickel and up to about 10 weight % chromium, contacting one face of said electrode coextensively with the metal oxide-free-face of the present bubble pressure barrier forming a composite structure, firing the resulting composite structure in a reducing atmosphere at or about atmospheric pressure sintering said barrier to said electrode forming an integral bond therewith, said bubble pressure barrier having a median pore size significantly smaller than the median pore size of said electrode, said firing to form said electrode composite not exceeding the melting point of said composite.

Those skilled in the art will gain a further and better understanding of the present invention from the detailed description set forth below, considered in conjunction with the figures accompanying and forming a part of the specification, in which.

Figure 7:
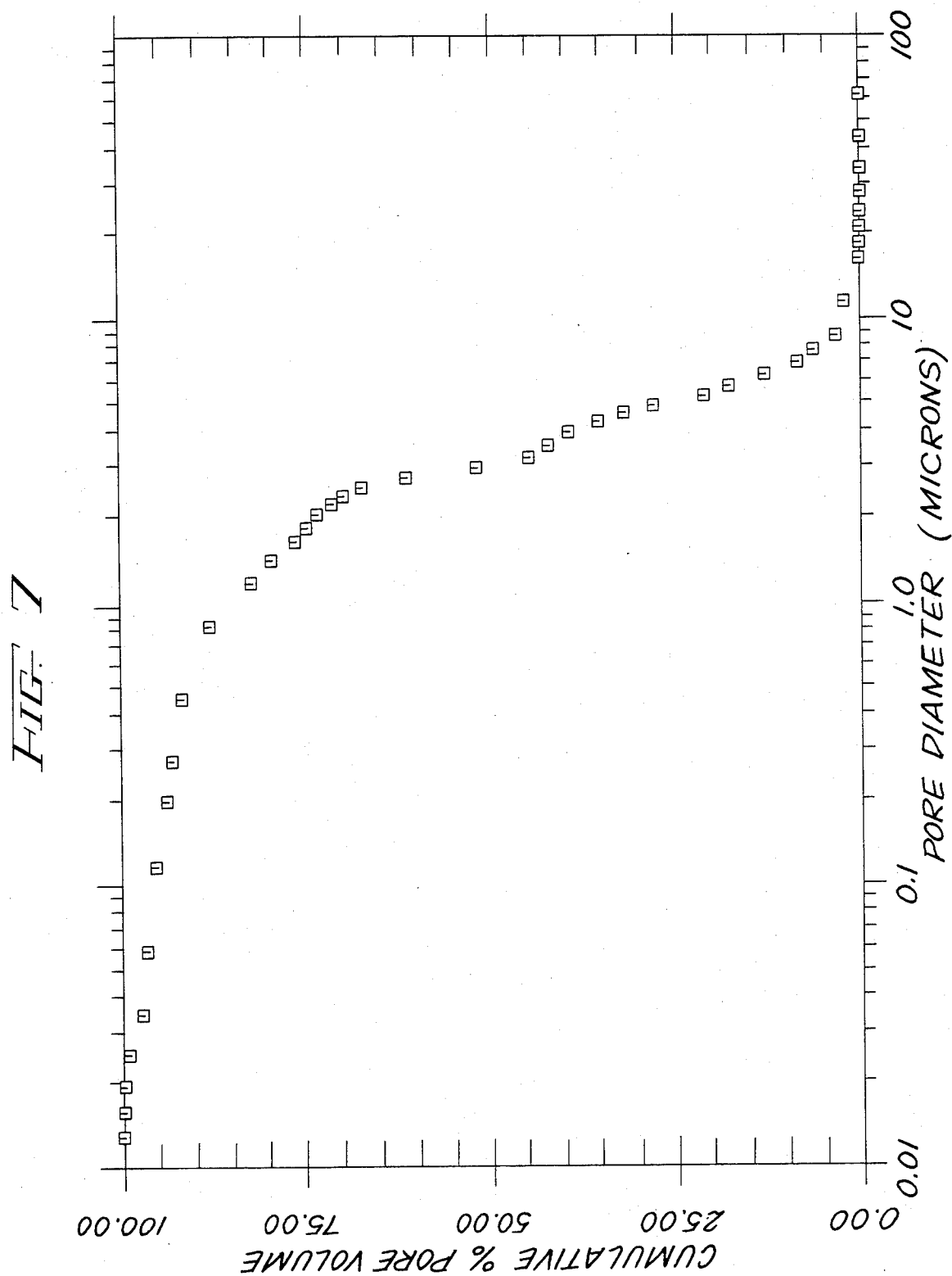
Figure 8:
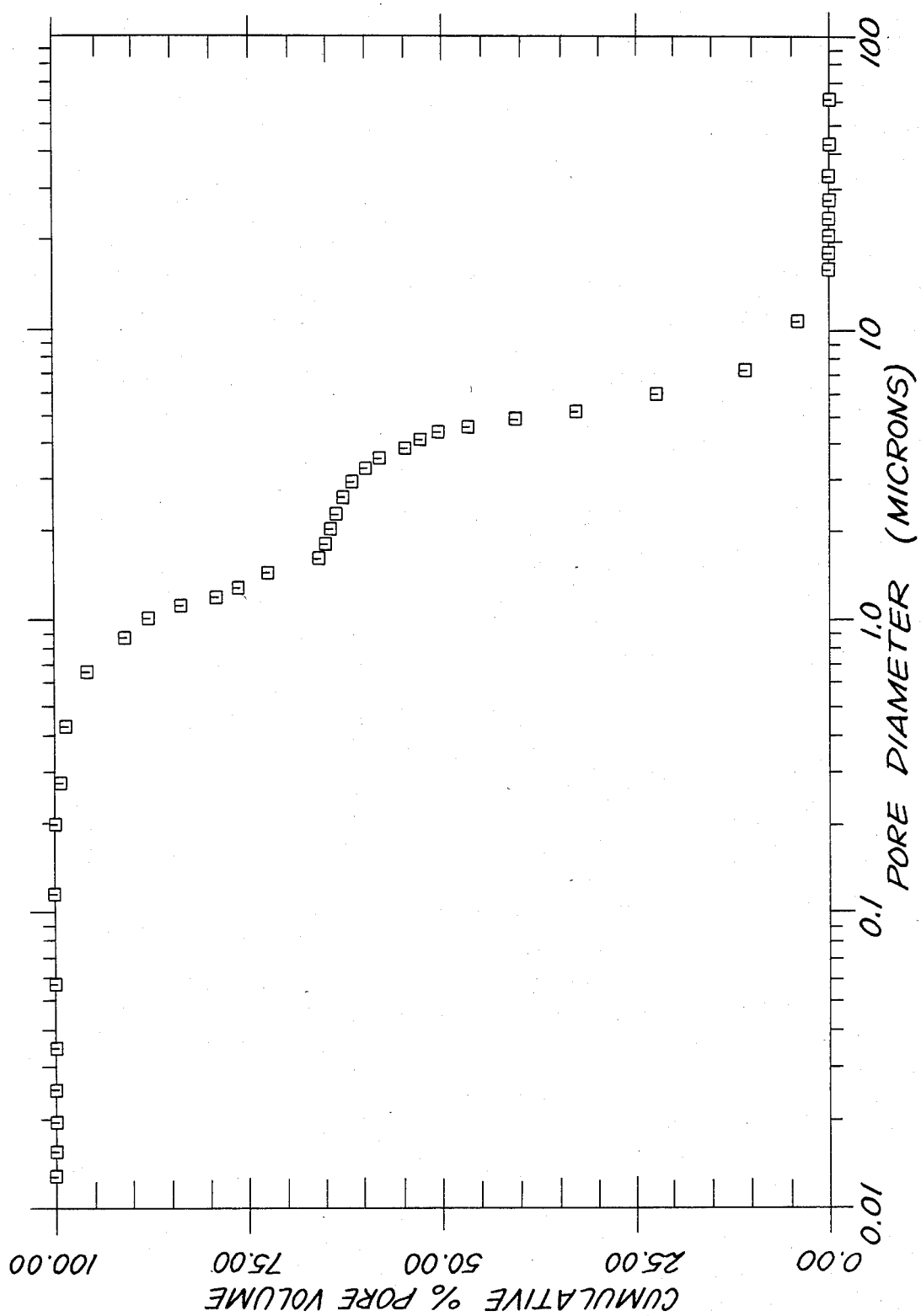

FIG. 7 illustrates on a semilogarithmic scale the pore size distribution of an anode composite of the present invention wherein the bubble pressure barrier is comprised of a Ni blank with $Al_2O_3$ distributed substantially uniformly throughout its pores and a Ni/10 wt % Cr anode; and FIG. 8 illustrates on a semilogarithmic scale the pore size distribution of an anode composite of the present invention wherein the bubble pressure barrier is comprised of a Ni blank with $TiO_2$ distributed throughout its pores and a Ni/10 wt % Cr anode.

Figure 1:
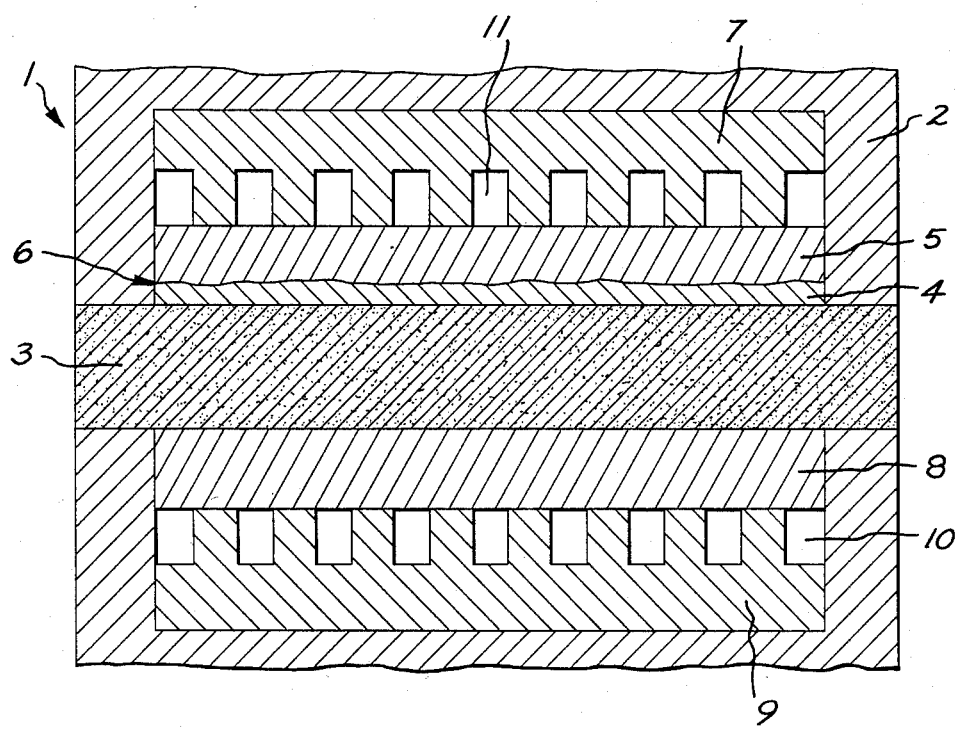
FIG. 1 shows in cross-section the cell hardware of one type of molten carbonate fuel cell with the present anode composite.

Specifically, FIG. 1 shows cell 1 with solid metal housing 2. One face of tile 3 is in contact with bubble pressure barrier 4 integrally sintered to anode 5. Barrier 4 and anode 5 comprise the present anode composite 6. Current collector plate 7 is associated with anode 5. Plate 7 is corrugated providing openings 11 for reactant gases for the hydrogen oxidation reaction. Cathode 8 contacts the opposite face of tile 3. Current collector plate 9 is associated with cathode 8. Plate 9 is corrugated providing openings 10 for reactant gases for the oxygen reduction reaction.

In carrying out the present process, a porous sintered blank in the form of a plaque is used. Plaque herein is defined as a thin flat piece of uniform or substantially uniform thickness. The blank is comprised of a metal selected from the group consisting of nickel, copper, an alloy of nickel and copper, and an alloy of nickel and up to about 10 weight % chromium. The blank has a pore size ranging from about 0.5 micron to about 16 microns, and a median pore size ranging from about 1 micron to about 10 microns, and preferably from about 3 microns to about 7 microns. The blank has a pore volume ranging from about 40% by volume to about 75% by volume, and preferably 60% by volume to about 70% by volume, of the total volume of the blank. The particular dimensions of the blank can vary depending on the dimensions of the bubble pressure barrier desired.

The blank can be produced by a number of sintering techniques. Preferably, it is produced by depositing a uniform layer of the blank-forming metal powder on a suitable substrate such as, for example, a graphite plate. The powder is fired in a reducing atmosphere at or about atmospheric pressure at a temperature ranging from about 700° C. to about 1200° C. to sinter the powder particles together. The particular firing temperature used depends on the metal powder being sintered, and it should not exceed the melting point of the powder. For example, copper melts at 1083° C. Preferably, the firing temperature is about 750° C. and at such temperature a firing time of about 15 minutes is suitable. Preferably, the blank-forming powder is fired between plates, such as graphite plates, utilizing means on the supporting plate to maintain the desired dimensions of the layer of deposited powder. The top plate provides a minor but sufficient pressure, usually less than 1 psi, which prevents formation of voids, i.e., excessively large pores, during sintering. The pore size of the sintered blank depends largely on the size or size distribution of the starting metal powder as well as firing temperature and the longer the firing time, the greater is the degree of sintering resulting in a larger pore size.

The porous blank is immersed, preferably at room temperature, in a fluid organometallic precursor for a metal oxide selected from the group consisting of aluminum oxide, titanium oxide, iron oxide, zinc oxide and cerium oxide.

The present organometallic precursor for the metal oxide is one which reacts with or is hydrolyzed by water or steam to produce a hydrolyzed product which is thermally decomposable to produce the metal oxide in at least a significant amount. The hydrolyzed product should decompose completely at or about atmospheric pressure at or below the temperature at which the metal oxide is produced leaving no significant amount of by-product residue. The present organometallic precursor can be a solid or liquid, and preferably, it is a liquid. Representative of the present organometallic precursor is titanium butoxide, aluminum secondary butoxide, aluminum isopropoxide, dimethyl zinc and mono(ethyl isonitrile)tetracarbonyl iron.

The present organometallic precursor is provided in the form of a fluid. By fluid organometallic precursor herein it is meant the precursor alone in liquid or fluid form, or the precursor in solid, liquid or viscous form diluted, dissolved or dispersed in an organic solvent in which it is inert or substantially inert. Representative of a suitable organic solvent is heptane and hexane. Preferably, when the fluid organometallic precursor is comprised of the precursor and solvent, the resulting solution or dispersion should be saturated or as highly concentrated as possible.

In carrying out the present process, the blank is immersed in the fluid precursor preferably within a chamber which can be evacuated. The chamber is evacuated to subject the fluid preferably at or about room temperature to a vacuum sufficient to evacuate or at least substantially evacuate the pores of the immersed blank filling them or at least significantly filling them, with the fluid precursor. Ordinarily, a vacuum of about 0.001 psi to about 0.5 psi is satisfactory. The completion of the filling of the pores can be determined empirically, for example, by observing the cessation of bubbles within the fluid precursor.

The resulting precursor filled-blank is retrieved from the precursor fluid. Such retrieval can be carried out by a number of conventional techniques such as, for example, by decanting the fluid.

Ordinarily, the retrieved fluid organometallic-containing blank also has organometallic sticking to its surface, i.e., the faces of the blank. Such surface organometallic is removed from at least one face of the blank leaving no significant amount thereof. The surface organometallic can be removed by a number of techniques such as, for example, by scraping the organometallic off. Removal of the organometallic from one face of the blank is necessary in the present process to prevent production of a strongly adherent oxide on subsequent firing which would prevent formation of an integral bond when producing the electrode composite.

The resulting precursor-filled-blank is infiltrated with water or steam to hydrolyze the precursor producing a hydrolyzed product within the pores of the blank. In one embodiment of the present invention, the precursor-filled-blank, i.e., precursor-containing-blank, is immersed in water, preferably at room temperature, within a chamber which can be evacuated. The chamber is evacuated to subject the water to a vacuum sufficient to drive it into the pores of the blank where it contacts and reacts with the precursor producing the hydrolyzed product. Ordinarily, a vacuum of about 0.001 psi to about 0.5 psi is satisfactory. Completion of the reaction of the hydrolysis is determinable empirically, for example, by the cessation of bubbles within the water.

In a preferred embodiment of the present invention, the resulting precursor-filled blank is permeated with steam to hydrolyze the precursor and produce the present hydrolyzed product within the pores of the blank. Such steam-permeation of the precursor containing-blank can be carried out by a number of techniques. For example, the precursor-filled-blank could be positioned on a continuous moving belt and passed through a chamber of steam so that the pores on both faces of the blank are permeated with steam to produce the present hydrolyzed product.

Completion of the present hydrolysis utilizing steam is determinable by a number of techniques. For example, from a series of experiments, knowing approximately how much weight gain will be produced, the amount of water required to produce such weight gain is calculated, and preferably, to insure complete hydrolysis, the required amount of water is doubled.

The present hydrolysis is illustrated by the following reactions:

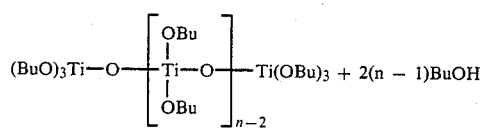

Alternately, if desired to make the pores smaller, the hydrolyzed product-containing blank can be recycled, i.e., subjected to the same treatment or cycled as the metal blank alone was to increase the amount of hydrolyzed product within the pores of the blank.

The resulting blank containing hydrolyzed product within its pores is fired to decompose the hydrolyzed product to the metal oxide leaving no significant amount of hydrolyzed product or by-product residue therein. This initial or first firing is carried out at a temperature ranging from the temperature at which hydrolyzed product decomposes to produce the metal oxide to less than about 600° C., and preferably up to about 550° C. A first firing temperature of about 600° C. or higher is not useful since it significantly increases the probability of entrapping water within the metal oxide formed, and also it produces larger sized metal oxide particles which decrease the pressure capacity of the pores. The completion of the first firing can be determined empirically, for example, by thermogravimetric analysis, i.e., when the sample stops losing weight. If it is desired to make the pores smaller, the metal oxide-containing blank can be recycled, i.e., it can be subjected to the same present treatment or cycled as the metal blank alone was, to increase the amount of metal oxide within the pores of the blank.

The resulting blank containing metal oxide within its pores is then fired to remove any water which may be present therein producing the present bubble pressure barrier. This subsequent or second firing is carried out at a temperature ranging from about 600° C. to about 700° C. A temperature lower than 600° C. would be insufficient to insure removal of entrapped water, whereas a temperature higher than about 700° C. provides no significant advantage. Completion of the second firing is determinable empirically, for example, by thermogravimetric analysis.

If it is desired to make the pores of the barrier smaller, the barrier can be recycled, i.e., it can be subjected to the same present treatment or cycled as the metal blank alone was, to increase the amount of metal oxide within the pores of the barrier.

The first and second firings are carried out at or about atmospheric pressure in a reducing atmosphere. Representative of the reducing atmosphere is a mixture of hydrogen and a noble gas, preferably about 10% by volume hydrogen balance argon. Preferably, both firings are carried out in the same reducing atmosphere as a continuous procedure. All of the present firings should have no significant deleterious effect on the resulting oxide containing blank, i.e., the bubble pressure barrier.

The bubble pressure barrier has pores distributed throughout its structure. The size of the pores in the barrier is critical. The barrier must have a median pore size significantly smaller than the median pore size of the electrode with which it forms the present electrode composite. Specifically, the pores of the barrier must be sufficiently small so that they are filled, i.e., flooded with electrolyte in order that electrolyte be maintained in the barrier. Generally, the median pore size or pore diameter in the bubble pressure barrier ranges from about $0.2\mu$ to about $2\mu$, and typically, it ranges from about $0.5\mu$ to about $1.5\mu$. Preferably, the median pore size of the barrier is larger than the median pore size of the matrix supporting the carbonate electrolyte.

The bubble pressure barrier has a pore volume less than about 40% by volume to less than about 75% by volume and generally about 35% by volume to about 70% by volume of the total volume of the barrier. The specific pore volume and pore size or pore size distribution is determinable empirically.

The present bubble pressure barrier can be as thin as desired. Generally, as a practical matter, the barrier has a minimum thickness of about 0.001 inch. Also, it can be as thick as desired, for example, as thick as about 0.030 inch. Typically, the thickness of the barrier ranges from about 0.005 inch to about 0.010 inch.

The present electrode composite is produced by making the bubble pressure barrier an integral part of an electrode which is useful as an electrode in a molten carbonate fuel cell. The composition and structure of the barrier does not differ significantly from that of the barrier integrally sintered to an electrode forming the present electrode composite. The electrode can be an anode or a cathode. The anode is composed of a metal selected from the group consisting of nickel, copper, an alloy of nickel or copper and an alloy of nickel and up to about 10 weight % chromium. The cathode is composed of a metal selected from the group consisting of nickel, copper and an alloy of nickel and cooper. An alloy of nickel and chromium is not useful in forming the present cathode composite.

In one embodiment of the present invention, the electrode composite is produced by providing the porous sintered electrode in the form of a plaque, contacting one face of the electrode coextensively with a face of the barrier forming a composite therewith, and firing the resulting composite structure integrally bonding the barrier and electrode producing the present electrode composite. A state-of-the-art anode or cathode can be used if desired.

Preferably, however, the present electrode composite is produced by depositing a uniform layer of electrode-forming powder on the metal oxide-free-face of the barrier covering the barrier face completely and firing the resulting composite structure forming a porous sintered electrode in position and simultaneously integrally bonding the barrier to the electrode. Preferably, the composite structure is fired between graphite plates with the top plate providing a minor but sufficient pressure, usually less than 1 psi, to prevent formation of voids, i.e., excessively large pores, during sintering.

To produce the present electrode composite, the composite structure is fired in a reducing atmosphere at or about atmospheric pressure at a temperature ranging from about 700° C. to about 1100° C., and preferably at about 1000° C. The particular firing temperature used depends on the material being fired, and it should not exceed the melting point of the composite. A firing temperature below about 700° C. will not produce the present integrally bonded electrode composite, whereas a temperature above about 1100° C. provides no significant advantage. Generally, firing time ranges from about 15 minutes to about 3 hours.

In the present invention, all of the firing or sintering should have no significant deleterious effect on the product being produced. Also, the reducing atmosphere used in the present firing or sintering preferably is comprised of about 10% by volume hydrogen balance argon.

The present electrode composite is useful as an electrode, i.e., as an anode or cathode, in a molten carbonate fuel cell. It is in the form of a plaque, i.e., a piece of uniform or substantially uniform thickness with a pair or flat faces, and it has pores distributed throughout its structure. Specifically, it is comprised of a porous sintered electrode which is in the form of a plaque, and a porous sintered bubble pressure barrier, which also is in the form of a plaque. In order for the present electrode composite to function satisfactorily, the bubble pressure barrier is integrally sintered to one face of the electrode and covers that electrode face entirely, i.e., it is coextensive therewith.

The present electrode composite has a pore volume ranging from higher than about 40% by volume to less than about 75% by volume, and preferably about 55% by volume, of the total volume of the composite. In the present electrode composite, the active electrode, i.e., anode or cathode, has a total pore volume, i.e., porosity, ranging from higher than about 40% by volume to less than about 75% by volume, and preferably about 60% by volume, of the total volume of the electrode. Also in the present electrode composite, the pressure barrier has a total pore volume ranging from less than about 40% by volume to less than about 75% by volume, and preferably about 50% by volume, of the total volume of the pressure barrier. A composite pore volume of about 55% is preferred since such porosity provides the integrally bonded electrode composite with good surface area for electrochemical reactions and allows it to have good density necessary for strength.

The specific pore volume and pore size or pore size distribution of the present electrode composite is determinable empirically. Specifically, the pore volume and pore size or size distribution of the electrode component depends largely on the porosity of the matrix supporting the carbonate electrolyte as well as the operating conditions of the cell. For best results, the electrode component of the composite should have a pore volume and pore size distribution which allow enough electrolyte to enter it to accomplish reaction but not so much as to "flood" it to the point where the reacting gas cannot diffuse rapidly to the reaction sites. Small pores in the electrode or matrix retain electrolyte in preference to large pores. In order for the electrode to perform well, it must take up enough electrolyte to allow the cell reaction; yet, it must not take up so much electrolyte that the gas cannot diffuse rapidly to and from the reaction sites. Preferably, therefore, the electrode should have some percentage of pores which are smaller than pores in the matrix for the electrode to retain electrolyte and a larger percentage of pores which are greater in size than pores in the matrix so as to remain dry. Generally, the median pore size of the electrode component of the electrode composite ranges from in excess of one micron to about 10 microns. Generally, the cathode has a median pore size which ranges from about 3 microns to about 5 microns and the anode has a median pore size ranging from about $4\mu$ to about $6\mu$. Also, generally, the pores in the electrode portion of the composite range in size from about 0.1 micron to about 20 microns, and frequently they range from about 2 microns to about 10 microns. Preferably, the electrode component of the composite which is a cathode ranges in thickness from about 0.01 inch to about 0.1 inch. Also, preferably, the electrode component of the present composite which is an anode ranges in thickness from about 0.004 inch to about 0.060 inch.

The present electrode composite is electrochemically active for the reactions of the molten carbonate fuel cell, and it is useful as an electrode in a molten carbonate fuel cell.

The invention is further illustrated by the following examples:

EXAMPLES

Examples 1–12 are tabulated in Table I. Example 1 was used as a reference and Examples 2–12 illustrate the present invention.

In Examples 1–9 and 12 the "Ni" material or electrode-forming powder was commercially available Nickel 123 powder ranging in size from about $2\mu$ to about $3\mu$. In Examples 7, 8, 10 and 11, the "Ni/10 wt % Cr" was a mixture of powders comprised of commercially available Ni 255 which had a chain-like structure ranging in size from about $2\mu$ to $4\mu$, and Cr powder which had a size of about $2\mu$.

All of the firings in Examples 1–12 were carried out at atmospheric pressure in a reducing atmosphere comprised of 10 volume % hydrogen/balance argon.

In Examples 1–12, to produce the porous sintered blank, Grafoil ® sheet was positioned on the surface of a graphite plate to produce a cavity 5.25" square and about 0.015" to 0.025" deep. The metal powder was deposited and doctor bladed into the cavity filling it producing a smooth layer. Grafoil ® (0.050" thick) sheet was placed on top of the deposited layer of powder and covered it substantially completely. A 6" square graphite plate was placed on top of the Grafoil ® covering it completely.

In Examples 7–9, and 12, pressure was applied to press the powder at room temperature under about 1000 psi. The applied pressure was then removed.

In Examples 1–12, a 2.5 kg steel plate was placed on top of the top graphite plate so that the body of powder would shrink substantially only in thickness during sintering, and each resulting structure was then fired at the given firing temperature for the given time. The power was then shut off and each blank was furnace cooled to room temperature.

In Examples 1–12, the resulting porous sintered blank had pores distributed throughout its structure which was substantially uniform. Each blank was in the form of a plaque and was uniform or substantially uniform in thickness. There was no significant difference between the thickness of the blank and that given for the barrier formed from it.

Each blank used in Table I was approximately 1.5" square. In Examples 2–12, the blank was treated in accordance with the present invention to produce a bubble pressure barrier, and in Examples 7, 8 and 9 the barrier was used to form the given electrode composite.

In Examples 2–12, the organometallic precursor was a liquid in which the sintered blank was immersed within a vacuum chamber. In Examples 2–12, the blank was immersed in the liquid precursor at room temperature which was then subjected to a vacuum which was about 0.001 psi. When cessation of bubbles within the liquid precursor was observed, which indicated filling of the pores in the blank, the vacuum was broken, the liquid was decanted and the resulting precursor-filled blank was retrieved.

In Examples 2 to 12, after each filling with precursor, the precursor sticking to the faces of the blank was scraped off leaving no significant amount thereof.

The resulting precursor-filled-blank was then infiltrated or permeated with steam to hydrolyze the precursor within the pores of the blank. Specifically, in Examples 2–12, steam was used, and in each of these examples, the required amount of water to produce the hydrolyzed product was calculated based on a series of experiments, and such amount was then doubled. Specifically, 800 ml water were used in Examples 2–6, 8, 10 and 11, 750 ml water were used in Example 7, and 1000 ml water were used in Examples 9 and 12. Steaming was carried out by covering a beaker containing the given amount of water with the precursor-filled blank, boiling the water, and when one-half the water was gone, turning the blank over to expose the opposite face of the blank to the steam produced by the remaining water.

In Examples 2–12, upon completion of each hydrolysis, any hydrolyzed product sticking to the faces of the blank was removed. Specifically, it was scraped off with a spatula except in Examples 7 and 8 where it was washed off with a 5 Molar sodium hydroxide solution followed by rinsing with distilled water.

In Example 2, the resulting hydrolyzed product-containing-blank was fired to produce the given sintered bubble pressure barrier.

The procedure, i.e., treatment, used to produce the hydrolyzed product in Examples 3–8 and 10–12 was the same as that disclosed for Example 2 except as noted herein and in Table I. In between the given number of treatments in Examples 3–7, 9 and 11, the hydrolyzed product-containing-blank was dried in a vacuum oven at 160° C. for 30 minutes. In Examples 6 and 9, the dried hydrolyzed product-containing-blank, as shown, was fired at 450° C. for 3 hours followed by firing at 650° C. for 10 hours, and furnace cooled to room temperature before being treated again to produce the hydrolyzed product-containing-blank.

In Table I, upon completion of all of the given number of treatments, all of the resulting hydrolyzed product-containing-blanks were fired at a temperature of 450° C. for 3 hours, then the temperature was raised to 650° C. where it was held for 10 hours and then furnace-cooled to room temperature.

The electrode composite of Examples 7, 8 and 9 was produced by tacking down the bubble pressure barrier with rubber cement, which completely decomposes below 450° C. leaving no residue, to a graphite plate to hold it flat. The exposed face of the barrier had been brushed with a wire brush to remove any metal oxide thereon leaving a clean face.

The procedure used to form the composite structure was substantially the same as set forth for forming the blank of Example 1. Specifically, the given electrode-forming powder was doctor bladed into the cavity covering the cleaned face of the barrier completely and producing a composite thickness of about 28 mils in Examples 7 and 8 and about 45 mils in Example 9. In Examples 7 and 8, the resulting structure as fired at 1000° C. for one hour and then furnace cooled to room temperature. In Example 9, the resulting composite structures were fired at 800° C. for one hour and then furnace cooled to room temperature.

Figure 6:
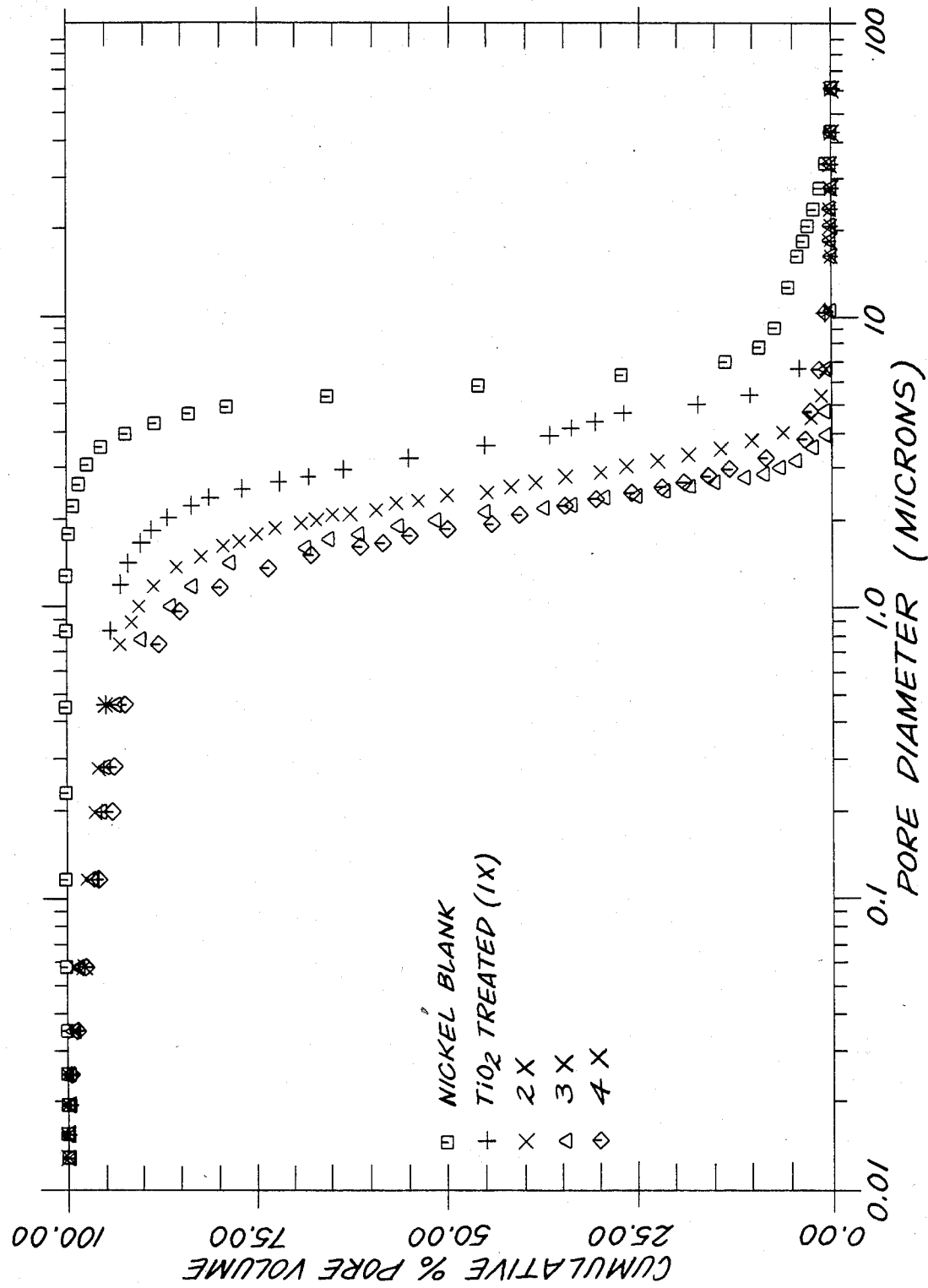
FIG. 6 illustrates on a semilogarithmic scale the pore size distribution of each of three of the present bubble pressure components which differ only in the amount of $TiO_2$ content, and also, as a reference, the pore size distribution of the nickel blank used to produce each of these bubble pressure barriers.

In Table I, the reference nickel blank of Example 1 and the bubble pressure barriers produced in Examples 2–12, as well as the electrode composites produced in Examples 7, 8 and 9, were analyzed by mercury intrusion porosimetry for porosity and pore size. The results are given in Table I and FIGS. 6, 7 and 8 are plots of the pore size distribution.

bonate fuel cell. The pore size distribution of the reference Ni blank of Example 1 and each of the barriers produced in Examples 2–5 is shown in FIG. 6. Specifically, FIG. 6 shows the effect of titanium dioxide incorporation on the pore size of the sintered porous blank.

A comparison of the densities of the barriers and the Ni reference blank of Table I shows that the lower the density of the barrier, the larger is the amount of metal oxide present in the barrier. Also, the void volume filled with metal oxide in Table I further exemplifies the fact that with increasing treatment in accordance with the present invention, increasing amounts of metal oxide are deposited in the barrier.

Figure 3:
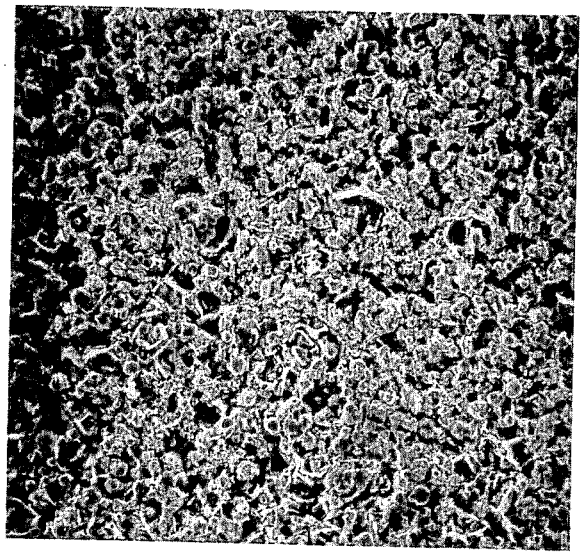
FIG. 3 is a scanning electron micrograph (magnified 500×) of the bubble pressure barrier portion of the composite of FIG. 2 with aluminum oxide distributed within its pores.
Figure 5:
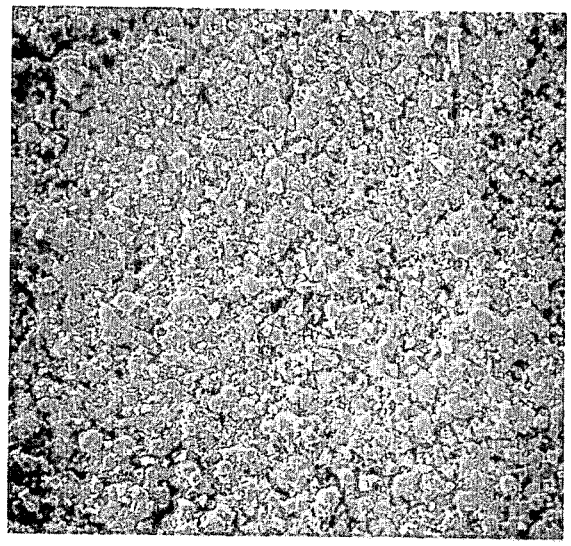
FIG. 5 is a scanning electron micrograph (magnified 500×) of the bubble pressure barrier portion of FIG. 4.

FIG. 3 shows the surface of the barrier component of the electrode composite produced in Example 8 and FIG. 5 shows the surface of the barrier component of the elelctrode composite produced in Example 7. FIGS. 3 and 5 illustrate the substantially uniform structure and distribution of the metal oxide of the barriers produced in accordance with the present invention.

In order to be able to examine the interface of the electrode composite, i.e., the integrally sintered portion

TABLE I

| | | Sintered Blank | | | | | Bubble Pressure Barrier | | | | |
|---|---|---|---|---|---|---|---|---|---|---|---|
| Ex-am-ple No. | Blank Formation | Median pore size ($\mu$) | Pore volume % by vol of blank | Organo-metallic precursor | Number of treat-ments | Pore volume % by vol of barrier | Median pore size ($\mu$) | Density (g/cc) | % vol. of pores filled | Thick-ness (mils) |
| | Material | Firing Temp (°C.) | Firing Time (min) | | | | | | | | |
| 1 | Ni (Reference) | 900 | 15 | 5.65 | 64.12 | — | — | — | — | — | — | 15 |
| 2 | Ni | " | " | " | " | Ti(BuO)$_4$ | 1 | — | 3.40 | 8.50 | 5.21 | " |
| 3 | Ni | " | " | " | " | Ti(BuO)$_4$ | 2 | 63.60 | 2.40 | 8.19 | 10.16 | " |
| 4 | Ni | " | " | " | " | Ti(BuO)$_4$ | 3 | 56.52 | 1.99 | 7.86 | 16.18 | " |
| 5 | Ni | " | " | " | " | Ti(BuO)$_4$ | 4 | 60.05 | 1.85 | 7.67 | 20.09 | " |
| 6 | Ni | " | " | " | " | Ti(BuO)$_4$ | 1/F/1 | 56.34 | 2.34 | 7.95 | 14.48 | " |
| 7 | Ni | 750 | " | 4.04 | 71.41 | Ti(BuO)$_4$ | 4 | 40.41 | 0.82 | 7.97 | 10.04 | 11 |
| 8 | Ni | " | " | " | " | Al(s-BuO)$_3$ | 1 | — | 2.00 | — | 2.33 | 9 |
| 9 | Ni | " | " | 2.97 | 53.45 | Ti(BuO)$_4$ | 3/F/3 | 39.57 | 0.65 | 7.71 | 29.66 | 13 |
| 10 | Ni/10 wt % Cr | 1000 | 60 | 10.57 | 73.50 | Al(s-BuO)$_3$ | 1 | 68.30 | 3.14 | 7.57 | 12.75 | 8 |
| 11 | Ni/10 wt % Cr | " | " | " | " | Al(i-PrO)$_3$ | 2 | 62.56 | 2.74 | 6.91 | 21.83 | 8 |
| 12 | Ni | 750 | 15 | 3.42 | 69.50 | Al(i-PrO)$_3$ | 1 | 68.47 | 2.18 | 8.26 | 6.47 | 12 |

| Example No. | Electrode forming powder | Sintered composite | Sintered composite thickness (mils) | Pore volume % by vol of composite | Composite median pore size ($\mu$) | Electrode median pore size ($\mu$) | Composite density (g/cc) | % of Composite pore volume in electrode |
|---|---|---|---|---|---|---|---|---|
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | Ni/10 wt % Cr | Anode composite | 21 | 51.17 | 4.32 | 5.56 | 8.34 | 65 |
| 8 | Ni/10 wt % Cr | Anode composite | 23 | 61.74 | 3.00 | 5.33 | 8.63 | 45 |
| 9 | Ni | Cathode composite | 35 | 62.48 | 6.29 | 7.00 | 8.09 | 75 |
| 10 | | | | | | | | |
| 11 | | | | | | | | |
| 12 | | | | | | | | |

In Examples 2–12, each bubble pressure barrier was in the form of a self-supporting plaque of uniform or substantially uniform thickness, and each had metal oxide distributed uniformly or substantially uniformly throughout within its pores.

Figure 2:
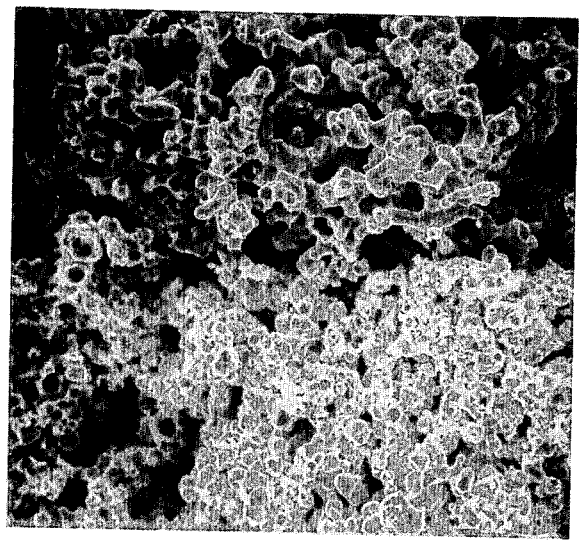
FIG. 2 is a scanning electron micrograph (magnified 700×) of the interface of the present anode composite showing the anode (larger pore size top portion) integrally sintered to the present bubble pressure barrier (smaller pore size bottom part) having aluminum oxide distributed within its pores.
Figure 4:
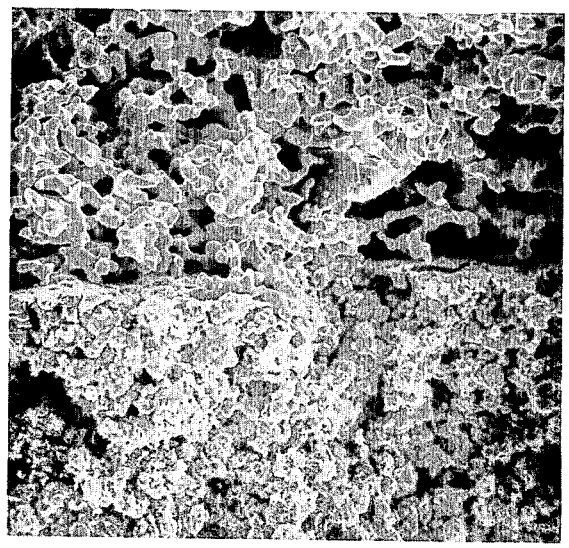
FIG. 4 is a scanning electron micrograph (magnified 700×) of the interface of the present anode composite showing the anode (larger pore size top portion) integrally sintered to the present bubble pressure barrier (smaller pore size bottom part) having titanium dioxide distributed within its pores.

A comparison of the examples of Table I shows that the porosity of the present barrier and its median pore size can be varied in accordance with the present process to produce a bubble pressure barrier suitable for forming an electrode composite useful in a molten carbetween the electrode and the pressure barrier, the sintered composites of Examples 7 and 8 were cracked approximately in half. The cracked surface portion of Example 7 is shown in FIG. 4 and that of Example 8 is illustrated in FIG. 2. Specifically, FIGS. 2 and 4 show the sintered integrally bonded portion of the present electrode composite, i.e., the portion between the electrode and the pressure barrier. Also, FIGS. 2 and 4 show that the median pore size of the bubble pressure barrier is significantly smaller than the median pore size of the electrode to which it is sintered.

The following copending applications are assigned to the assignee hereof and are incorporated herein by reference:

Ser. No. 433,315 filed on even date herewith for B. R. Karas and C. E. Baumgartner, entitled BUBBLE PRESSURE BARRIER, discloses that utilizing an inorganic precursor, a metal oxide is formed within the pores of a porous sintered blank substantially uniformly throughout the porosity of the blank producing a porous bubble pressure barrier of predetermined pore size, that the barrier is integrally sintered to a face of an electrode, the median pore size of the barrier being significantly smaller than that of the electrode, producing a composite useful as an electrode in a molten carbonate fuel cell, and that the blank and the electrode are composed of metal.

Ser. No. 416,448 filed about Sept. 7, 1982 for C. D. Iacovangelo entitled CATHODE COMPOSITE FOR MOLTEN CARBONATE FUEL CELL discloses a cathode composite useful for a molten carbonate fuel cell comprised of a porous sintered cathode having a porous sintered bubble pressure barrier integrally sintered to one face thereof, said cathode composite having a porosity ranging from about 25% by volume to about 75% by volume of the total volume of said composite, said cathode having a porosity ranging from about 25% by volume to about 75% by volume of the total volume of said cathode, said pressure barrier having a porosity ranging from about 25% by volume to about 75% by volume of the total volume of said barrier, said cathode having a median pore size ranging from in excess of one micron to about 10 microns, said barrier having a median pore size significantly smaller than that of said cathode, said cathode and said pressure barrier being comprised of from about 10 weight % to about 90 weight % $Li_xNi_{(1-x)}O$/balance $Li_yCu_{(1-y)}O$, where x and y each ranges from about 0.005 to about 0.25.

Ser No. 371,879 filed Apr. 26, 1982 for C. D. Iacovangelo and K. P. Zarnoch entitled ANODE COMPOSITE FOR MOLTEN CARBONATE FUEL CELL, now U.S. Pat. No. 4,404,267, discloses an anode composite useful for a molten carbonate fuel cell comprised of a porous sintered metallic anode component having a porous bubble pressure barrier integrally sintered to one face thereof, said barrier being comprised of metal coated ceramic particles sintered together and to said anode by means of said metal coating, said metal coating enveloping said ceramic particle and being selected from the group consisting of nickel, copper and alloys thereof, the median pore size of the barrier being significantly smaller than that of the anode.

What is claimed is:

1. A process for producing a porous bubble pressure barrier having metal oxide distributed substantially uniformly throughout its pores and having at least one face free of any significant amount of said metal oxide which comprises providing a porous sintered blank in the form of a plaque comprised of a metal selected from the group consisting of nickel, copper, an alloy of nickel and copper, and an alloy of nickel and up to about 10 weight % chromium, said blank having a median pore size ranging from about 1 micron to about 10 microns, and a pore volume ranging from about 40% to about 75% by volume of the total volume of said blank, immersing said blank in a fluid organometallic precursor for a metal oxide selected from the group consisting of aluminum oxide, titanium oxide, iron oxide, zinc oxide and cerium oxide, subjecting said fluid to a vacuum sufficient to at least substantially evacuate the pores of said immersed blank and at least significantly fill said evacuated pores with said fluid, retrieving the resulting precursor-filled blank, removing said precursor from at least one face of said blank leaving no significant amount thereof, infiltrating said precursor-filled-blank with water or steam hydrolyzing said precursor within the pores of said blank producing a hydrolyzed product, first firing the resulting hydrolyzed product-containing-blank to convert said hydrolyzed product to said metal oxide leaving no significant amount of said hydrolyzed product therein at a temperature ranging from the temperature at which said product decomposes to said metal oxide to less than about 600° C., and second firing the resulting metal oxide-containing-blank to remove any water which may be present therein at a temperature ranging from about 600° C. to about 700° C., said first and second firings being carried out at or about atmospheric pressure in a reducing atmosphere, said first and second firings having no significant deleterious effect on said bubble pressure barrier.

2. The process according to claim 1 wherein said metal oxide is aluminum oxide.

3. The process according to claim 1 wherein said metal oxide is titanium dioxide.

* * * * *